United States Patent
Li et al.

(10) Patent No.: US 8,895,164 B2
(45) Date of Patent: Nov. 25, 2014

(54) PERPENDICULAR MAGNETIC RECORDING MEDIUM

(75) Inventors: Tuqiang Li, Yamanashi (JP); Shunji Takenoiri, Yamanashi (JP); Yuko Ueki, Tokyo (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 347 days.

(21) Appl. No.: 12/457,394

(22) Filed: Jun. 9, 2009

(65) Prior Publication Data

US 2009/0305080 A1 Dec. 10, 2009

(30) Foreign Application Priority Data

Jun. 10, 2008 (JP) ................................. 2008-151746

(51) Int. Cl.
*G11B 5/66* (2006.01)
*G11B 5/667* (2006.01)
*G11B 5/65* (2006.01)

(52) U.S. Cl.
CPC ................ *G11B 5/667* (2013.01); *G11B 5/656* (2013.01)
USPC ...................................... 428/828.1

(58) Field of Classification Search
USPC ................................. 428/827–829
See application file for complete search history.

(56) References Cited

U.S. PATENT DOCUMENTS

| | | | | |
|---|---|---|---|---|
| 2004/0234818 A1* | 11/2004 | Tanahashi et al. | ..... | 428/694 TM |
| 2007/0065681 A1* | 3/2007 | Girt et al. | ...................... | 428/828 |
| 2007/0087226 A1* | 4/2007 | Matsumoto et al. | ........ | 428/828.1 |
| 2008/0075979 A1* | 3/2008 | Inamura et al. | ................ | 428/828 |
| 2008/0090106 A1* | 4/2008 | Braunstein et al. | ............ | 428/829 |
| 2009/0011281 A1* | 1/2009 | Oikawa et al. | ................. | 428/812 |

FOREIGN PATENT DOCUMENTS

| | | | | |
|---|---|---|---|---|
| JP | 06036928 | * | 2/1994 | .............. H01F 10/16 |
| JP | 2007-109358 | | 4/2007 | |
| JP | 2007-184019 | | 7/2007 | |
| JP | 2007-273055 | | 10/2007 | |
| JP | 2007-294032 | | 11/2007 | |

* cited by examiner

*Primary Examiner* — Holly Rickman
*Assistant Examiner* — Linda Chau
(74) *Attorney, Agent, or Firm* — Rabin & Berdo, P.C.

(57) ABSTRACT

A perpendicular magnetic recording medium, which includes a nonmagnetic substrate, and a first underlayer in the form of a soft magnetic under-layer (SUL), a second underlayer, an intermediate layer, a magnetic recording layer, a protective layer, and a lubricant layer sequentially laminated on the nonmagnetic substrate. The SUL has a plurality of SUL layers including a type-A SUL layer, a plurality of type-B SUL layers including at least two adjacent type-B SUL layers, and a nonmagnetic metal spacer layer disposed between the two adjacent type-B SUL layers. The type-A SUL layer may include a material selected from Co, Fe and Ni, a material selected from Cr, V and Ti, and a material selected from W, Zr, Ta and Nb. Each of the type-B SUL layers is in antiferromagnetic coupling, and may include a material selected from Co, Fe and Ni, a material selected from Cr, V and Ti, and a material selected from W, Zr, Ta and Nb.

12 Claims, 3 Drawing Sheets

| Example/ Comp. Example | SUL 2 and SUL 4 Composition | SUL 5 Composition | SUL 5 Thickness (nm) | Underlayer 6 Composition | Underlayer 6 Thickness (nm) | OW (dB) | SNR (dB) | Number of Particles *1 before | Number of Particles *1 after | grade *2 |
|---|---|---|---|---|---|---|---|---|---|---|
| Example 1 | $Co_{72}Fe_{20}Nb_6Zr_2$ | $Co_{57}Fe_{25}Cr_{10}Nb_6Zr_2$ | 5.5 | $Co_{56}Ni_{35}Cr_5Fe_4$ | 6.0 | 35.2 | 14.51 | 49 | 50 | ○ |
| Example 2 | $Co_{72}Fe_{20}Nb_6Zr_2$ | $Co_{67}Fe_{20}V_5Nb_6Zr_2$ | 5.5 | $Co_{56}Ni_{35}Cr_5Fe_4$ | 6.0 | 36.1 | 14.49 | 48 | 48 | ○ |
| Example 3 | $Co_{72}Fe_{20}Nb_6Zr_2$ | $Co_{69}Fe_{20}Ti_7Nb_4Zr_4$ | 5.5 | $Co_{56}Ni_{35}Cr_5Fe_4$ | 6.0 | 35.8 | 14.50 | 50 | 50 | ○ |
| Example 4 | $Co_{72}Fe_{20}Nb_6Zr_2$ | $Co_{57}Fe_{25}Cr_{10}Nb_6Zr_2$ | 5.5 | $Ni_{88}Cr_5W_7$ | 10.0 | 34.3 | 14.61 | 50 | 51 | ○ |
| Example 5 | $Co_{72}Fe_{20}Nb_6Zr_2$ | $Co_{57}Fe_{25}Cr_{10}Nb_6Zr_2$ | 5.5 | $Ni_{94}Ti_6$ | 6.0 | 34.9 | 14.57 | 48 | 48 | ○ |
| Comp Ex 1 | $Co_{72}Fe_{20}Nb_6Zr_2$ | $Co_{72}Fe_{20}Nb_6Zr_2$ | 5.5 | $Co_{56}Ni_{35}Cr_5Fe_4$ | 6.0 | 36.8 | 14.55 | 51 | 342 | × |
| Comp Ex 2 | $Co_{72}Fe_{20}Nb_6Zr_2$ | $Co_{57}Fe_{25}Cr_{10}Nb_6Zr_2$ | 5.5 | $Co_{61}Ni_{35}Fe_4$ | 5.5 | 35.3 | 14.46 | 49 | 101 | × |
| Comp Ex 3 | $Co_{57}Fe_{25}Cr_{10}Nb_6Zr_2$ | $Co_{57}Fe_{25}Cr_{10}Nb_6Zr_2$ | 5.5 | $Co_{56}Ni_{35}Cr_5Fe_4$ | 6.0 | 28.8 | 13.52 | 48 | 38 | ○ |
| Comp Ex 4 | $Co_{60}Fe_{25}Ti_7Nb_6Zr_2$ | $Co_{57}Fe_{25}Cr_{10}Nb_6Zr_2$ | 5.5 | $Co_{56}Ni_{35}Cr_5Fe_4$ | 6.0 | 29.2 | 13.68 | 49 | 42 | ○ |

*1) Number of particles before and after storage in high temperature and humidity environment

*2) ○: acceptable, ×: unacceptable

FIG. 3

PERPENDICULAR MAGNETIC RECORDING MEDIUM

CROSS-REFERENCE TO RELATED APPLICATION

This application is based on, and claims the priority benefits of, Japanese Patent Application No. 2008-151746, filed on Jun. 10, 2008, the entire contents of which are incorporated herein by reference.

BACKGROUND OF THE INVENTION

1. Field of the Invention

The present invention relates to a perpendicular magnetic recording medium for use in hard disc drives (HDDs) or the like.

2. Description of the Related Art

With the density increase of HDDs, the magnetic recording system of the HDDs has been changed from a longitudinal magnetic recording system to a perpendicular magnetic recording system that is more suited for high-density recording. Media for use in HDDs of the perpendicular magnetic recording system (referred to as perpendicular recording media hereinafter) is characterized by the orientation of the axis of easy magnetization of the magnetic recording layer, which is in the direction perpendicular to the substrate surface. Another characteristic of the perpendicular recording media is the provision of an underlayer in the form of a soft under-layer (referred to as SUL hereinafter). An intense recording field is obtained by returning a magnetic field generated by a magnetic head upon signals recorded through the SUL.

In order to enhance the recording density of the media, it is essential to reduce media noise. Various attempts have been made for the noise reduction. Among these attempts, segregating nonmagnetic substance to grain boundaries in the magnetic recording layer reduces exchange interactions between magnetic crystal grains of the magnetic recording layer and minimizes magnetic inversion units, thereby reducing the media noise.

Materials used for the magnetic recording layer of longitudinal magnetic recording media include alloy materials such as CoCrPt and CoCrTa. For these alloy materials, chromium, a nonmagnetic material, segregates to grain boundaries to isolate the crystal grains from each other to reduce the media noise. The segregation of chromium to the grain boundaries has been improved by devising film deposition processes such as heating and substrate bias application. However, for the perpendicular magnetic recording media, the processes of heating and substrate bias application, such as those used in the longitudinal media, segregates the chromium only in a small amount, causing difficulty in media noise reduction.

To solve this problem, a granular medium using a magnetic recording layer of CoPtCr—$SiO_2$ has been proposed, in which magnetic isolation of crystal grains is promoted by segregation of oxides to grain boundaries. In the granular layer of CoPtCr—$SiO_2$, the $SiO_2$ segregates surrounding crystal grains of CoPtCr to magnetically isolate each crystal grain of CoPtCr. The granular medium is reported to be able to more effectively reduce media noise as compared with perpendicular magnetic recording media that use magnetic recording layer material of conventional CoCr alloy.

In order to increase the segregation of $SiO_2$ to the grain boundaries in the granular layer of CoPtCr—$SiO_2$, the pressure of atmosphere in the deposition process needs to be elevated. Such a high pressure, however, decreases the density of the layer. The lowered density of the layer results in a problem that corrosive components such as moisture and oxidizing substance pass through the gap between crystal grains and reach the SUL, thus causing corrosion of the SUL. Moreover, the protective layer must be made thinner to reduce the space between the magnetic head and the medium. A thin protective film, however, is liable to have initial defects or defects due to driving operation. Accordingly, the defects in the protective film increase the corrosion of the SUL, which can become a severe problem.

Japanese Patent Publication 2007-109358 (and the corresponding U.S. Patent Publication US 2007/0087226 A1) discloses a method to improve corrosion resistance by decreasing cobalt concentration contained in the SUL. Japanese Patent Publication 2007-184019 discloses a method to provide a barrier layer on the SUL surface for protecting the SUL. However, just reducing cobalt concentration in the SUL was unable to attain satisfactory improvement in corrosion resistance. As for providing a barrier layer, since defects in the barrier layer itself cannot be completely eliminated, corrosion of the SUL through these defects is still inevitable. Further, adding the barrier layer expands the space between the magnetic head and the SUL, which may degrade the write ability of the medium.

Japanese Patent Publication 2007-294032 discloses an improvement in corrosion resistance with a soft magnetic material of amorphous CoFeAlCr alloy with an additive of Ta, Nb or Zr. The document further discloses that the soft magnetic layer can be composed of a plurality of layers, and two layers in the soft magnetic layer can be coupled with a ruthenium layer therebetween using antiferromagnetically coupling (AFC).

Japanese Patent Publication 2007-273055 discloses that material of an amorphous soft magnetic layer with AFC contains at least one element selected from the group consisting of Fe, Co, Ni, Al, Si, Ta, Ti, Zr, Hf, V, Nb, C, and B. The document further discloses that another soft magnetic layer can be provided as an upper layer.

However, Japanese Patent Publications 2007-294032 and 2007-273055 do not recognize that electromagnetic performances are degraded by addition of chromium, titanium or the like in the soft magnetic layer with AFC in the magnetic recording medium of the two documents. Therefore, it is desired to have a method that improves corrosion resistance of the SUL itself without degrading performances of the medium.

SUMMARY OF THE INVENTION

A perpendicular magnetic recording medium, which includes a nonmagnetic substrate, and a first underlayer in the form of a soft magnetic under-layer (SUL), a second underlayer, an intermediate layer, a magnetic recording layer, a protective layer, and a lubricant layer sequentially laminated on the nonmagnetic substrate. The SUL has a plurality of SUL layers including a type-A SUL layer, a plurality of type-B SUL layers including at least two adjacent type-B SUL layers, and a nonmagnetic metal spacer layer disposed between the two adjacent type-B SUL layers.

The type-A SUL layer may include a material selected from Co, Fe and Ni, a material selected from Cr, V and Ti, and a material selected from W, Zr, Ta and Nb. Each of the type-B SUL layers is in antiferromagnetic coupling, and may include a material selected from Co, Fe and Ni, a material selected from Cr, V and Ti, and a material selected from W, Zr, Ta and Nb.

BRIEF DESCRIPTION OF THE DRAWINGS

FIG. 3 shows a table that contains the compositions of the SUL and the underlayer of the perpendicular magnetic recording medium according to the invention, and the film thicknesses of the SUL and the underlayer in Examples and Comparative Examples.

DETAILED DESCRIPTION OF THE INVENTION

Figure 1:
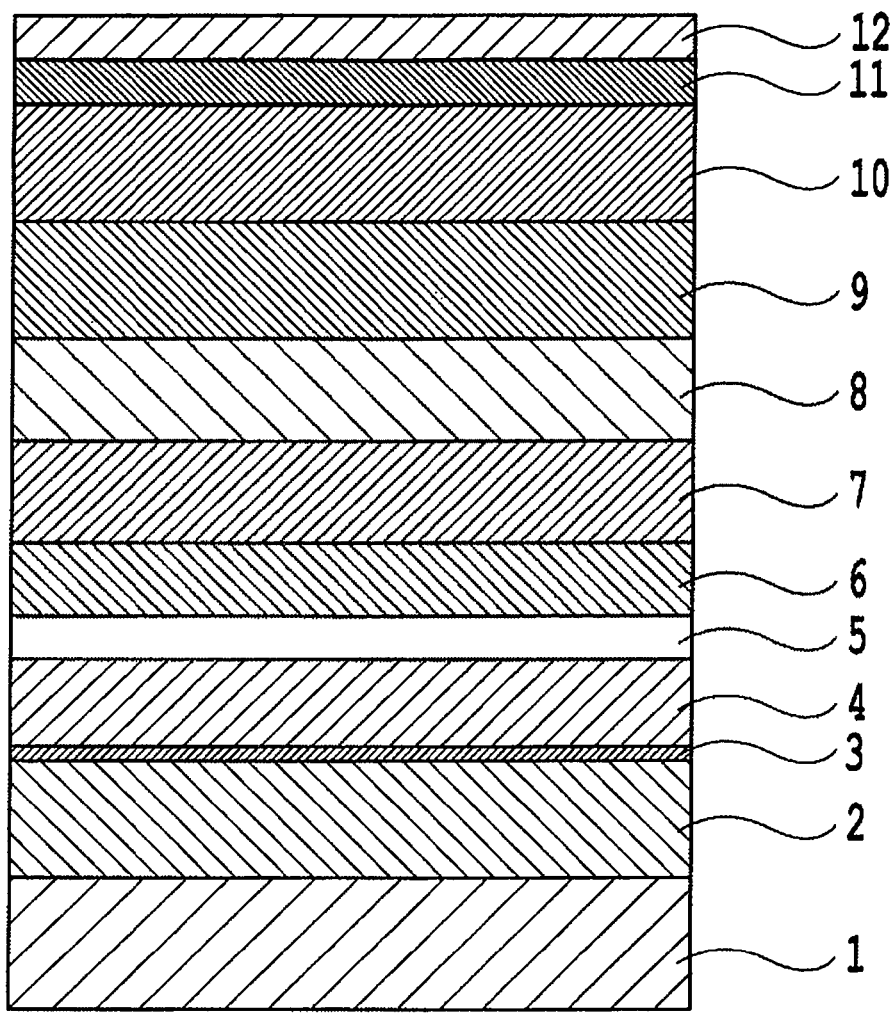
FIG. 1 is a schematic sectional view illustrating an exemplar structure of a perpendicular magnetic recording medium according to the invention.

To achieve high recording density for a perpendicular magnetic recording medium, it is essential to isolate crystal grains is the media. In order to solve the problem of corrosion involved in the isolation of crystal grains, it is necessary to enhance corrosion resistance of individual layers composing the magnetic recording medium. In particular, the SULs should contain an element that can suppress corrosion. Moreover, the corrosion resistance of the media should be enhanced by controlling the structure of each layer in the media.

The present invention relates to a perpendicular magnetic recording medium including at least a nonmagnetic substrate, a first underlayer in the form of an SUL, a second underlayer, an intermediate layer, a magnetic recording layer, a protective layer, and a lubricant layer laminated in this order. The SUL in the invention is composed of a plurality of layers including a type-A SUL that is closest to the magnetic recording layer, two or more type-B SULs, and one or more magnetic metal spacer sub-layers each disposed between two adjacent type-B SULs. The type-B SULs are in AFC. The type-A SUL is in direct contact with one of the type-B SULs, as illustrated in FIG. 1.

The type-A SUL is composed of a material selected from Co, Fe and Ni, a material selected from Cr, V and Ti, and a material selected from W, Zr, Ta and Nb. The type-B SULs are each composed of a material selected from Co, Fe and Ni, and a material selected from W, Zr, Ta, and Nb.

Now, the invention will be described in more detail with reference to the accompanying drawings. The perpendicular magnetic recording medium shown in the drawings is only an illustrative example of an embodiment of the invention, and the present invention is not intended to be limited to the example.

FIG. 1 is a schematic sectional view illustrating an exemplar structure of a perpendicular magnetic recording medium according to the invention. The perpendicular magnetic recording medium of FIG. 1 includes a first SUL 2 (a type-B SUL), a nonmagnetic metal spacer layer 3, a second SUL 4 (a type-B SUL), a third SUL 5 (a type-A SUL), an underlayer 6, a first intermediate layer 7, a second intermediate layer 8, a lower magnetic recording layer 9, an upper magnetic recording layer 10, a protective layer 11, and a lubricant layer 12, laminated on a nonmagnetic substrate 1 in the order described above. Hence, the SUL layer of FIG. 1 is composed of three sub-layers: one type-A SUL and two type-B SULs.

The following specifically describes the constitutional elements of the embodiment of the invention shown in FIG. 1.

The nonmagnetic substrate 1 in a magnetic recording medium is composed of the materials used in ordinary magnetic recording media, such as a NiP-plated aluminum alloy, glass, reinforced glass, and crystallized glass.

The surface of the substrate 1 is preferably made smooth using an ordinary polishing technique. A centerline average roughness (Ra) is desired to be in the range of 0.1 to 0.4 nm after the polishing. The polished substrate is thoroughly cleaned to remove contaminants on the substrate surface. Deposition processes are then conducted on the nonmagnetic substrate 1.

An SUL inhibits diffusion of magnetic flux generated by a magnetic head in the recording process and ensures a perpendicular magnetic field. The SUL layer includes a type-A SUL (e.g. the third SUL 5 in FIG. 1) that is a backing layer disposed closest to the magnetic recording layer, two type-B SULs (the first SUL 2 and the second SUL 4 in FIG. 1), and a nonmagnetic metal spacer layer 3 provided between the two type-B SULs. The embodiment in FIG. 1 has two type-B SULs. However, the invention is not limited to this construction, and more type-B SULs can be included in the SUL layer. Preferably, every pair of type-B SULs has a nonmagnetic metal spacer layer interposed therebetween. When three type-B SULs are provided, for example, a nonmagnetic metal spacer layer is provided between the first and the second SULs, and another nonmagnetic metal spacer layer is provided between the second and the third SULs.

The first SUL 2 and the second SUL 4, which are both type-B SULs, are composed of one or more materials selected from the group consisting of Co, Fe and Ni, and one or more materials selected from the group consisting of W, Zr, Ta and Nb. The first SUL 2 and the second SUL 4 have a saturation magnetization Bs of at least 1.4 T. If the Bs of the type-B SULs is less than 1.4 T, thicknesses of the type-B SULs must be increased to achieve a satisfactory write performance, thus degrading the productivity. Moreover, if the Bs values of the type-B SULs are less than 1.4 T, intensity Hex of AFC between the SULs is weak, and the SULs will generate high noises in the signal reproduction process. It is preferable to set a total concentration of cobalt and iron to at least 85 at % (atomic percent) and an iron concentration to at least 10 at %.

Adding an element selected from W, Zr, Ta, and Nb, which all have a high melting temperature and a large atomic size, makes the SUL an amorphous structure or an amorphous-like structure. The amorphous structure avoids the coarsening of the media surface, which enables the magnetic head to fly at a low height. Moreover, unlike a crystalline SUL, an amorphous SUL incurs no noise due to grain boundaries, which make it possible to have high recording density.

The SUL 2 and the SUL 4 are made in an AFC condition by providing a nonmagnetic metal spacer layer made of ruthenium or a ruthenium alloy, for example, between the SUL 2 and the SUL 4. The AFC between the SULs suppresses magnetic domain wall formation in the SULs, and thus eliminates spark noise generated from the SULs in the signal reproduction process. In order to attain intense AFC, the thickness of the nonmagnetic metal spacer layer is preferably in the range of 0.4 to 1.0 nm.

An SUL closest to the magnetic recording layer (the type-A SUL in FIG. 1) is preferably composed of one or more materials selected from the group consisting of Co, F and Ni, one or more materials selected from the group consisting of Cr, V and Ti, and one or more materials selected from the group consisting of W, Zr, Ta and Nb.

When the type-A SUL contains chromium, the chromium concentration is preferably in the range 5 at % to 40 at %. If the chromium concentration is less than 5 at %, the effect of corrosion resistance from chromium is insufficient, causing the corrosion of the type-A SUL. However, if the chromium concentration is larger than 40 at %, the Bs value of the type-A SUL is insufficiently low, thus causing an SUL loss its function.

When the type-A SUL contains vanadium, the vanadium concentration is preferably in the range 5 at % to 40 at %, for the same reasons described above for the chromium-containing type-A SUL. Similarly, when the type-A SUL contains titanium, the titanium concentration preferably is within the range 5 at % to 40 at %, for the same reasons described above for the chromium-containing type-A SUL.

Containing chromium, vanadium, or titanium enhances the corrosion resistance of the type-A SUL.

The thickness of the type-A SUL is preferably in the range of 2 nm to 8 nm, and the structure of the type-A SUL is preferably amorphous. A type-A SUL with an amorphous structure stops corrosive substances of moisture and oxidizing components penetrating from the substrate surface, and prevents the corrosive substances from reaching the type-B SULs that are vulnerable to corrosion. The layers from the magnetic recording layer to the type-A SUL can hardly be corroded since they contain chromium, vanadium, or titanium. The type-B SULs are also protected from corrosion because of the anti-corrosion barrier effect of the type-A SUL.

A type-A SUL thinner than 2 nm is of an insufficient thickness to function as a corrosion barrier, and cannot prevent corrosive substances from passing through the thin type-A SUL to corrode the type-B SULs. A type-A SUL thicker than 8 nm lowers the Bs value of the overall SUL, and thus degrades the write performance of the medium.

Moreover, adding chromium, vanadium or titanium into the type-B SULs is unfavorable because doing so may cause the Bs value of the SULs to be less than 1.4 T.

The total thickness of the SUL, which is a sum of the thickness of the type-A SUL, that of the type-B SULs, and that of the nonmagnetic metal spacer layers, is preferably in the range of 10 nm to 80 nm. A total thickness less than 10 nm results in unsatisfactory write performance, and a total thickness larger than 80 nm decreases AFC intensity and causes increased noise from the SUL, and thus results in a degraded productivity.

The SULs and the nonmagnetic metal spacer layer can be deposited by means of any methods and conditions known in the art including sputtering methods, such as a DC magnetron sputtering method and an RF magnetron sputtering method, and a vacuum deposition method, for example. More specifically, in the DC magnetron sputtering, a gas pressure is preferably in the range of 0.4 Pa to 4 Pa, and the type of the gas is preferably argon.

The underlayer adjacent to the SUL is composed of one or more materials selected from the group consisting of Co, Ni, Fe, Cr, V, Ti, W and Ta. This underlayer can be composed of one or more layers. In order to enhance corrosion resistance, the underlayer preferably contains one or more materials selected from the group consisting of Cr, V, and Ti. Advantageously, the underlayer is a crystalline layer having an fcc (111) orientation or an hcp (001) orientation with respect to the substrate. The thickness of the underlayer is preferably in the range of 1.5 to 15 nm. An underlayer thinner than 1.5 nm degrades perpendicular orientation of the magnetic recording layer and deteriorates the read/write performance and the thermal fluctuation resistance. An underlayer thicker than 15 nm increases the grain size in the magnetic recording layer, and degrades the signal to noise ratio (SNR). If the underlayer has the property of magnetism, the product Bs×t of the Bs value and thickness t of the underlayer is preferably at most 7.0 T nm for reducing the transition noises from grain boundaries of the underlayer.

The underlayer can be deposited by any method and under any condition known in the art including sputtering methods, such as a DC magnetron sputtering method and an RF magnetron sputtering method, and a vacuum deposition method, for example.

An intermediate layer improves the crystallinity of a magnetic recording layer and aligns the c-axis perpendicularly to the film surface. In the embodiment example shown in FIG. 1, the intermediate layer preferably includes a first intermediate layer and a second intermediate layer. Having a plurality of intermediate layers brings the advantage that these intermediate layers can each be chosen from a material suitable for its function, so that some of the intermediate layers can be used for improving crystallinity (i.e. the first intermediate layer), and some of the intermediate layers can be used for improving perpendicular orientation (i.e. the second intermediate layer).

The first intermediate layer is composed of one or more materials selected from the group consisting of Co, Ni, Cr, V, Ti, W, and Ta. In order to enhance the corrosion resistance of the intermediate layer, the intermediate layer preferably contains one or more materials selected from the group consisting of Cr, V, and Ti. In order to prevent the intermediate layer from exhibiting the properties of magnetism, a cobalt concentration is set at most at 70 at % and an nickel concentration is set at most 92 at %. The second intermediate layer is composed of ruthenium or a ruthenium alloy.

The intermediate layer can be deposited by any method and under any condition known in the art. For example, the method may be a sputtering method, such as a DC magnetron sputtering method or an RF magnetron sputtering method, or it may be a vacuum deposition method.

The magnetic recording layer can be a single layer or a laminate of two or more layers. The magnetic recording layer is composed of an alloy of a main component of Co—Cr—Pt (i.e. the sum of the Co, Cr and Pt is at least 60 at %), or a material having a granular structure in which Co—Cr—Pt grains are dispersed in a matrix of a nonmagnetic oxide or a nonmagnetic nitride.

More specifically, the magnetic recording layer is composed of one or more materials selected from the group consisting of Co—Cr—Pt—$TiO_2$ alloy, Co—Cr—Pt—$SiO_2$ alloy, Co—Cr—Pt—O alloy, and Co—Cr—Pt—B alloy. Preferably every one of these alloys contains at least 5 at % of chromium. Containing chromium enhances the corrosion resistance of the magnetic recording layer. Examples of preferred compositions of these alloys are given in the following. In this specification, the numerals of subscript (for example, 67 in $Co_{67}$, 7 in $(TiO_2)_7$, (91-y) in $Co_{(91-y)}$, y in $V_y$, etc.) following the symbols of elements and groups ($TiO_2$, $SiO_2$ etc.) represent percentage of the atoms or atom groups in atomic percent in the alloy.

Co—Cr—Pt—TiO2 alloy: Co67-Cr10-Pt16-(TiO2)7
Co—Cr—Pt—SiO2 alloy: Co60-Cr14-Pt18-(SiO2)8
Co—Cr—Pt—O alloy: Co57-Cr18-Pt16-O9
Co—Cr—Pt—B alloy: Co66-Cr16-Pt14-B4

The protective layer 11 is provided for protecting the layers formed thereunder and also for suppressing cobalt elution. The material of the protective layer 11 can be selected from materials commonly used in ordinary perpendicular magnetic recording media, which may include protective layer materials mainly composed of carbon, such as diamond like carbon (DLC) and amorphous carbon, and various types of thin film materials known as protective layer materials of the magnetic recording media. The protective layer 11 can be of the same thickness as that of ordinary perpendicular magnetic recording media.

The protective layer 11 can generally be formed by sputtering methods including a DC magnetron sputtering method and an RF magnetron sputtering method, a vacuum deposition method, a CVD method and the like.

The liquid lubricant layer 12 is provided for the purpose of reducing a frictional force generated between the protective layer and the magnetic head, thereby improving durability and reliability of the magnetic recording media. The material for the liquid lubricant layer can be selected from the materials commonly used in magnetic recording media, for example, perfluoropolyether lubricant. The thickness and other parameters of the lubricant layer can be the same as those used in ordinary perpendicular magnetic recording media.

The liquid lubricant layer can be formed by any application method known in the art including a dip coating method and a spin coating method.

The invention will be described more in detail with reference to specific embodiment examples.

Figure 2:
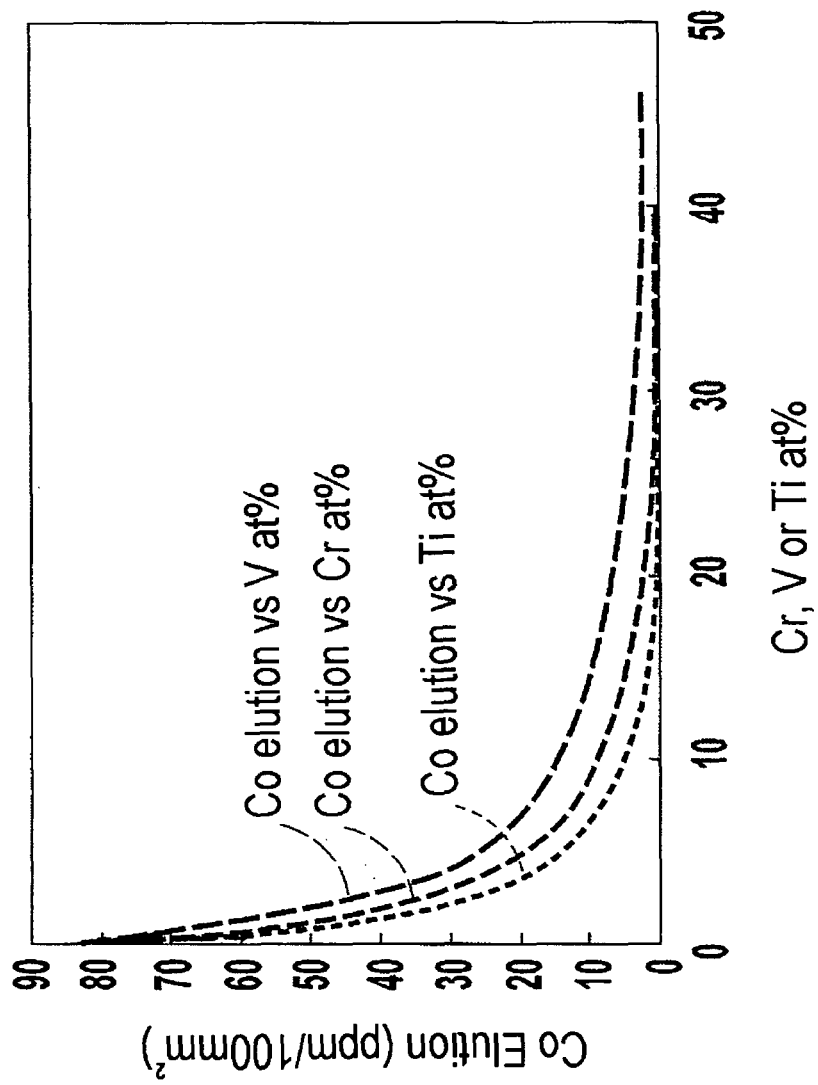
FIG. 2 shows a plot of an amount of cobalt elution out of a target material as a function of a content of chromium, vanadium or titanium.

Extensive corrosion prevention experiments have been conducted with source materials (i.e. targets) to find the film compositions that effectively prevent the corrosion of the film. FIG. 2 shows the amount of the cobalt elution out of a target material as a function of the content of chromium, vanadium or titanium. The target materials were treated with 3% nitric acid at room temperature for 10 minutes before the elution measurement. The amount of cobalt elution was remarkably reduced for the target materials containing chromium, vanadium or titanium in an amount at least 5 at %, demonstrating enhanced corrosion resistance. The compositions of the targets used in the experiments are given below.

Chromium-containing target: C0(91-x)-Crx-Zr5-Nb4, x=2, 5, 10, 20, 30

Vanadium-containing target: C0(91-y)-Vy-Zr5-Nb4, y=2, 5, 10, 20, 30

Titanium-containing target: C0(91-z)-Tiz-Zr5-Nb4, z=2, 5, 10, 20, 30

The amount of the cobalt elution from the target materials was measured by the ICP (induction-coupled plasma) method.

Magnetic recording media having the layer structure of FIG. 1 were manufactured and evaluated.

1. Example 1

The substrates used were aluminum substrates having a diameter of 95 mm and a thickness of 1.75 mm. The substrate was textured by a floating abrasive method using nonwoven fabric and diamond slurry, obtaining the Ra value after the texturing of 0.2 nm.

Then, the aluminum substrate was cleaned thoroughly, dried, and introduced into a deposition apparatus. The deposition method was a DC magnetron sputtering method unless otherwise specified. Argon gas with a gas pressure of 0.9 Pa was used as the sputtering gas. Next, a layer having a composition of $Co_{72}Fe_{20}Nb_6Zr_2$ (i.e. the SUL 2 in FIG. 2) was deposited on the aluminum substrate. The thickness of the deposited $Co_{72}Fe_{20}Nb_6Zr_2$ layer was 25 nm and the layer had an amorphous structure. Subsequently, a nonmagnetic metal spacer layer 3 was deposited to a thickness of 0.6 nm using a sputtering target of pure ruthenium. On this layer, a layer having the same composition as the SUL 2 was deposited to a thickness of 15.5 nm, which was the SUL 4 with a composition of $Co_{72}Fe_{20}Nb_6Zr_2$. Then, a layer having a composition of $Co_{66}Fe_{20}Cr_6Nb_6Zr_2$, (the SUL 5), was deposited to a thickness of 5 nm. The SUL 5 also had an amorphous structure.

On the SUL 5, an underlayer 6 with an fcc (111) orientation was deposited to a thickness of 6.0 nm using a target of $Co_{56}Ni_{35}Cr_5Fe_4$. In order to obtain fine grains, the deposition process was conducted in an atmosphere of argon gas at a pressure of 30 mTorr (4 Pa).

Subsequently, an intermediate layer 7 and an intermediate layer 8 were deposited. The first intermediate layer 7 having a composition of $Co_{61}Cr_{34}Ta_5$ was deposited to a film thickness of 12 nm at an argon gas pressure of 80 mTorr (10.7 Pa) using a sputtering target of $Co_{61}Cr_{34}Ta_5$. Then, a second intermediate layer 8 of ruthenium was deposited to a film thickness of 11 nm at an argon gas pressure of 90 mTorr (12 Pa) using a sputtering target of pure ruthenium.

Subsequently, a magnetic recording layer is formed that has a two-layer structure of magnetic recording layers 9 and 10. A first magnetic recording layer 9 was deposited to a film thickness of 8.5 nm in a mixed gases of argon and oxygen at a gas pressure of 40 mTorr (5.3 Pa) using a sputtering target of $Co_{62}Cr_{14}Pt_{18}(SiO_2)_6$. An oxygen concentration in the mixed gases of argon and oxygen was 2 vol %. Then, a second magnetic recording layer 10 was deposited to a film thickness of 7.5 nm using a sputtering target of $Co_{64}Cr_{20}Pt_{10}B_6$.

Subsequently, a protective layer 11 of carbon was formed by a plasma-enhanced chemical vapor deposition (PECVD) method and a sputtering method. A protective layer was formed to a film thickness of 3.0 nm by the PECVD method using ethylene gas, and subsequently, another protective layer was formed to a film thickness of 0.5 nm by a sputtering method using a carbon target.

Subsequently, a lubricant layer 12 of perfluoropolyether was applied to a film thickness of 1.2 nm by a dip coating method.

A magnetic recording medium of Example 1 was obtained through the above-described procedure.

2. Example 2

A magnetic recording medium of Example 2 was produced in the same manner as in Example 1 except that SUL 5 was deposited to a film thickness of 5 nm using a sputtering target of $Co_{67}Fe_{20}V_5Nb_6Zr_2$.

3. Example 3

A magnetic recording medium of Example 3 was produced in the same manner as in Example 1 except that SUL 5 was deposited to a film thickness of 5 nm using a sputtering target of $Co_{69}Fe_{20}Ti_7Nb_4Zr_4$.

4. Example 4

A magnetic recording medium of Example 4 was produced in the same manner as in Example 1 except that an underlayer 6 was deposited to a film thickness of 10 nm using a sputtering target of $Ni_{88}Cr_5W_7$.

5. Example 5

A magnetic recording medium of Example 5 was produced in the same manner as in Example 1 except that an underlayer 6 was deposited to a film thickness of 6 nm using a sputtering target of $Ni_{94}Ti_6$.

6. Comparative Example 1

A magnetic recording medium of Comparative Example 1 was produced in the same manner as in Example 1 except that the SUL 5 was deposited to a film thickness of 5 nm using a sputtering target of $Co_{72}Fe_{20}Nb_6Zr_2$, which was the same composition as the target for SUL 4.

7. Comparative Example 2

A magnetic recording medium of Comparative Example 2 was produced in the same manner as in Example 1 except that the underlayer 6 was deposited to a film thickness of 5.5 nm using a sputtering target of $Co_{61}Ni_{35}Fe_4$.

8. Comparative Example 3

A magnetic recording medium of Comparative Example 3 was produced in the same manner as in Example 1 except that the SUL 2 and the SUL 4 were deposited using a sputtering target of $Co_{57}Fe_{25}Cr_{10}Nb_6Zr_2$.

9. Comparative Example 4

A magnetic recording medium of Comparative Example 4 was produced in the same manner as in Example 1 except that the SUL 2 and the SUL 4 were deposited using a sputtering target of $Co_{60}Fe_{25}Ti_7Nb_6Zr_2$.

Table 1 in FIG. 3 shows the compositions of SUL 2, SUL 4, SUL 5, and underlayer 6, and the film thicknesses of SUL 5 and underlayer 6 of the magnetic recording media for all of the Examples and the Comparative Examples.

The magnetic recording media of the Examples and the Comparative Examples were evaluated for their read/write performances (overwrite characteristics OW (dB) and signal to noise ratio SNR (dB)) and their corrosion resistance performances, the results of which are given in Table 1 in FIG. 3.

The corrosion resistance performance was evaluated by comparing optical surface analyzer (OSA) particle count for deposited layers of the medium and the OSA particle count for the layers of the medium after leaving in an environment of a high temperature of 80° C. and high humidity of 85% for 96 hours. For media with enhanced corrosion resistance, as shown for the media of the Examples, the particle count scarcely increases after leaving them in the high temperature and high humidity environment.

As shown in FIG. 3, when chromium or titanium was added to SUL 2 and to SUL 4, although no problem arises in corrosion resistance performances, write performances degrade resulting in decreased SNR.

It should be understood, that the invention is not necessarily limited to the specific process, arrangement, materials and components shown and described above, but may be susceptible to numerous variations within the scope of the invention.

What is claimed is:

1. A perpendicular magnetic recording medium, comprising:
   a nonmagnetic substrate; and
   a first underlayer formed as a soft magnetic under-layer (SUL), a second underlayer, an intermediate layer, a magnetic recording layer, a protective layer, and a lubricant layer sequentially laminated on the nonmagnetic substrate; wherein
   the SUL has a plurality of SUL layers including a type-A SUL layer being closest to the magnetic recording layer among the SUL layers, a plurality of type-B SUL layers including at least two adjacent type-B SUL layers, and a nonmagnetic metal spacer layer disposed between the two adjacent type-B SUL layers, wherein
      both the type-A SUL layer and each of the type-B SUL layers include a material selected from the group consisting of Co, Fe and Ni, and a material selected from the group consisting of W, Zr and Nb, and
      the type-A SUL layer further includes V, and each of the type-B SUL layers is free of V.

2. The perpendicular magnetic recording medium of claim 1, wherein each of the type-B SUL layers is in antiferromagnetic coupling (AFC).

3. The perpendicular magnetic recording medium of claim 1, wherein the type-A SUL layer has a thickness within the range 2 nm to 8 nm, and is of an amorphous structure.

4. The perpendicular magnetic recording medium of claim 1, wherein the type-A SUL layer contains vanadium in a concentration between 5 at % and 40 at %.

5. The perpendicular magnetic recording medium of claim 1, wherein the nonmagnetic metal spacer sub-layer includes ruthenium or a ruthenium alloy.

6. The perpendicular magnetic recording medium of claim 1, wherein the type-B SUL layers have a saturation magnetization (Bs) of at least 1.4 T.

7. The perpendicular magnetic recording medium of claim 1, wherein a sum of a thickness of the type-A SUL layer, an overall thickness of the type-B SUL layers and a thickness of the nonmagnetic metal spacer layer is in the range 10 nm to 80 nm.

8. The perpendicular magnetic recording medium of claim 1, wherein the second underlayer has a layer including a material selected from a group consisting of Co, Ni, Fe, Cr, V, Ti, W and Ta.

9. The perpendicular magnetic recording medium of claim 1, wherein the second underlayer is a crystalline layer having an fcc (111) orientation or an hcp (001) orientation with respect to the substrate.

10. The perpendicular magnetic recording medium of claim 1, wherein the magnetic recording layer has a layer including an alloy of a main component of Co—Cr—Pt, or a material having a granular structure in which Co—Cr—Pt grains are dispersed in a matrix of a nonmagnetic oxide or a nonmagnetic nitride.

11. The perpendicular magnetic recording medium of claim 10, wherein the alloy includes chromium in a concentration in the range 5 at % to 40 at %.

12. The perpendicular magnetic recording medium of claim 10, wherein the Co—Cr—Pt grains include chromium in a concentration in a range of 5 at % to 40 at %.

* * * * *